(12) United States Patent
Cocker et al.

(10) Patent No.: US 7,765,434 B2
(45) Date of Patent: Jul. 27, 2010

(54) RESOURCE EFFICIENT SOFTWARE TRACING FOR PROBLEM DIAGNOSIS

(75) Inventors: Mark Andrew Cocker, Bournemouth (GB); Paul Kettley, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 532 days.

(21) Appl. No.: 11/831,786

(22) Filed: Jul. 31, 2007

(65) Prior Publication Data

US 2008/0126873 A1     May 29, 2008

(30) Foreign Application Priority Data

Nov. 23, 2006    (GB)  ............................... 0623354.8

(51) Int. Cl.
     *G06F 11/00*      (2006.01)
(52) U.S. Cl. .......................................... 714/45; 714/38
(58) Field of Classification Search .................... 714/45
See application file for complete search history.

(56) References Cited

U.S. PATENT DOCUMENTS

| 6,826,747 | B1 * | 11/2004 | Augsburg et al. ............ 717/128 |
| 2002/0138788 | A1 * | 9/2002 | Yenne et al. ................... 714/38 |
| 2007/0101198 | A1 * | 5/2007 | Ueno ........................... 714/38 |

* cited by examiner

*Primary Examiner*—Michael C Maskulinski
(74) *Attorney, Agent, or Firm*—Patents on Demand, P.A.; Brian K. Buchheit (57) ABSTRACT

The present invention discloses a solution that defines multiple retry points for a software application which are operable to generate and record trace information only as part of a retry execution in response to an exception. Outside these conditions, the burdens of generating and recording trace information can be avoided. Furthermore, the determination of a preferred one of these retry points can be made to focus the retry execution in a way that only the retry point which generates the most helpful, or informative, trace information is necessarily reverted to in response to an exception.

20 Claims, 9 Drawing Sheets

RESOURCE EFFICIENT SOFTWARE TRACING FOR PROBLEM DIAGNOSIS

CROSS-REFERENCE TO RELATED APPLICATIONS

This application claims the benefit of British Patent Application No. 0623354.8 filed 23 Nov. 2006 and which is hereby incorporated by reference.

BACKGROUND

1. Field of the Invention

The present invention relates to the field of software technologies, and, more specifically, to a resource efficient software tracing for problem diagnosis.

2. Description of the Related Art

Problems can be encountered during the execution of a software application. For example, exceptions to the normal operation of the software application can manifest in many ways, including but not limited to, irregular or undesirable results, erroneous data, interruptions to execution, poor performance, excessive and unnecessary resource utilization, abnormal or premature termination, abnormal state, and a complete failure of the application. The process of problem determination for such exceptions can involve the use of many tools and techniques. Most notably, the capture of information relating to the state of a software application at the point of a problem occurrence. For example, techniques such as First Failure Data Capture (FFDC) can provide an automated snapshot of a system environment when an unexpected internal error occurs. Furthermore, the provision of memory and state 'dumps' is well known in the event of software failure and is common in such software as operating systems.

The inadequacies of such data capture techniques in problem determination are widely known to those skilled in the art, and include the limited scope of the data collected at the point of exception. For example, it is not possible to retrieve state information leading up to an exception using such techniques. To address these deficiencies, software tracking is often employed to monitor and record software application state information at execution time. In this way, a rich set of valuable trace information can be recorded for the entire execution of a software application such that, in the event of an exception, state information for the entire period leading up to the exception is available to assist in problem determination.

However, recording trace information routinely during the execution of a software application is burdensome and imposes a further resource requirement over and above that of the software application itself, manifesting as a requirement for further storage, and processing throughput. In some environments, the burden of generating and recording trace information at execution time can be so great that it exceeds the resource requirements of the software application itself. For this reason, a decision to include facilities for the generation and recording of trace information in a software application involved compromise. The balance is between a resource-efficient, high performance software application and a rich set of trace information for use in the event of exceptions at runtime. However this balance is struck for a particular software application, one of performance and reliability will be compromised.

It would therefore be advantageous to provide for the advantages of a software application which is free of the burden of routinely generating and recording trace information at runtime, while retaining the richness of trace data provided where such trace information is generated and recorded in the event of an exception.

SUMMARY OF THE INVENTION

The present invention discloses a solution that defines multiple retry points for a software application which are operable to generate and record trace information only as part of a retry execution in response to an exception. Outside these conditions, the burdens of generating and recording trace information can be avoided. Furthermore, the determination of a preferred one of these retry points can be made to focus the retry execution in a way that only the retry point which generates the most helpful, or informative, trace information is necessarily reverted to in response to an exception.

The present invention can be implemented in accordance with numerous aspects consistent with the material presented herein. For example, one aspect of the present invention can include a method for generating trace information for an exception in a software application. The software application can include a set of retry points. Each of the retry points can be a defined point in a series of instructions for the execution of the software application. The method can include a step of repeatedly executing the software application to cause occurrences of the exception. For each occurrence of the exception, execution can revert to a different one of the retry points such that after multiple occurrences of the exception each of the retry points is reverted to. Execution of each of the retry points includes generating trace information for the execution of the software application. A preferred retry point can be determined, which is used to generate trace information for subsequent occurrences of the exception.

It should be noted that various aspects of the invention can be implemented as a program for controlling computing equipment to implement the functions described herein, or as a program for enabling computing equipment to perform processes corresponding to the steps disclosed herein. This program may be provided by storing the program in a magnetic disk, an optical disk, a semiconductor memory, or any other recording medium. The program can also be provided as a digitally encoded signal conveyed via a carrier wave. The described program can be a single program or can be implemented as multiple subprograms, each of which interact within a single computing device or interact in a distributed fashion across a network space.

It should also be noted that the methods detailed herein can also be methods performed at least in part by a service agent and/or a machine manipulated by a service agent in response to a service request.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
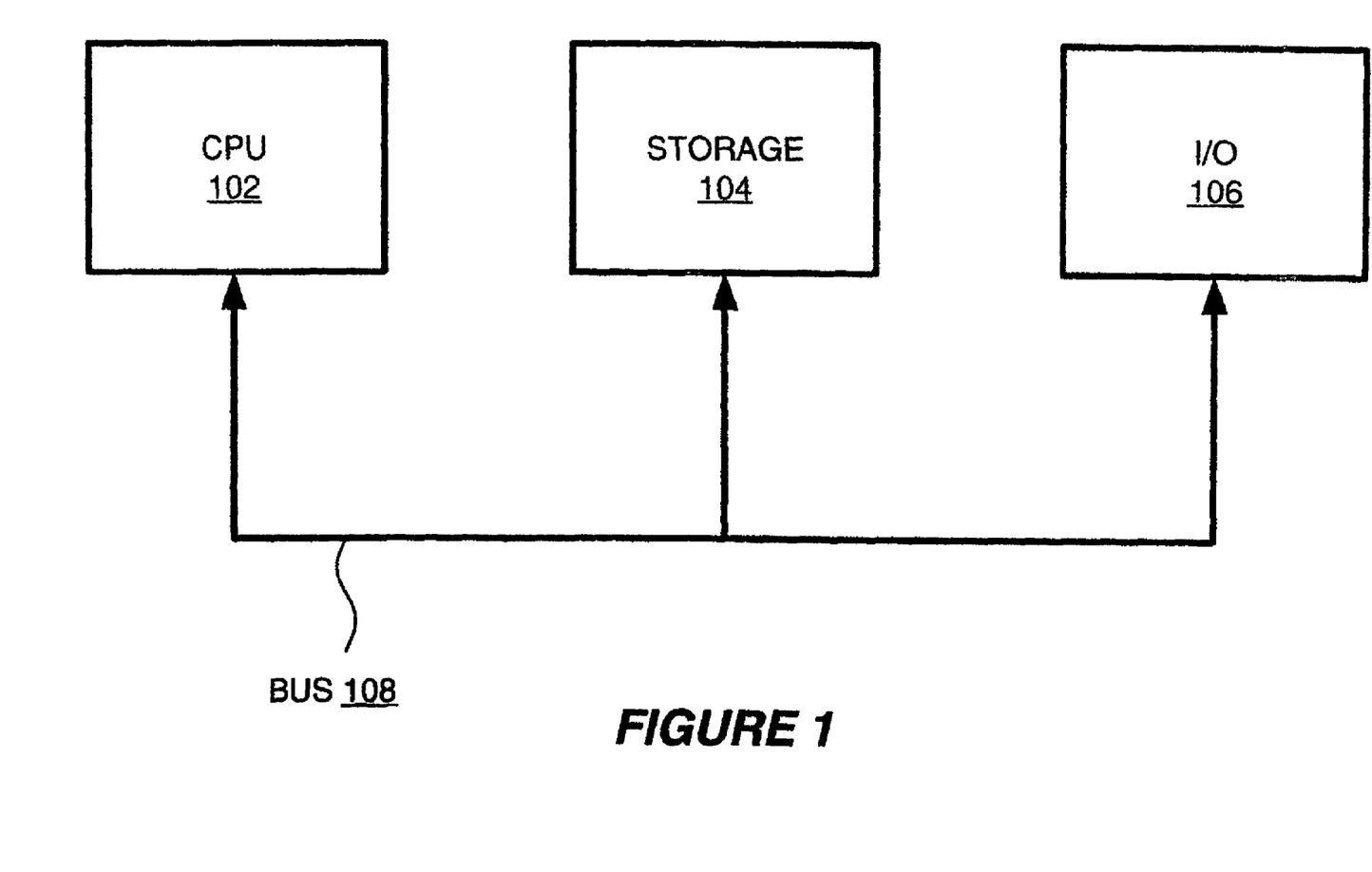
FIG. 1 is a block diagram of a computer system suitable for the operation of embodiments of the present invention.

FIG. 1 is a block diagram of a computer system suitable for the operation of embodiments of the present invention. A central processor unit (CPU) 102 is communicatively connected to a storage 104 and an input/output (I/O) interface 106 via a data bus 108. The storage 104 can be any read/write storage device such as a random access memory (RAM) or a non-volatile storage device. An example of a non-volatile storage device includes a disk, tape, optical, or other storage device. The I/O interface 106 is an interface to devices for the input or output of data, or for both input and output of data. Examples of I/O devices connectable to I/O interface 106 include a keyboard, a mouse, a display (such as a monitor) and a network connection.

Figure 2:
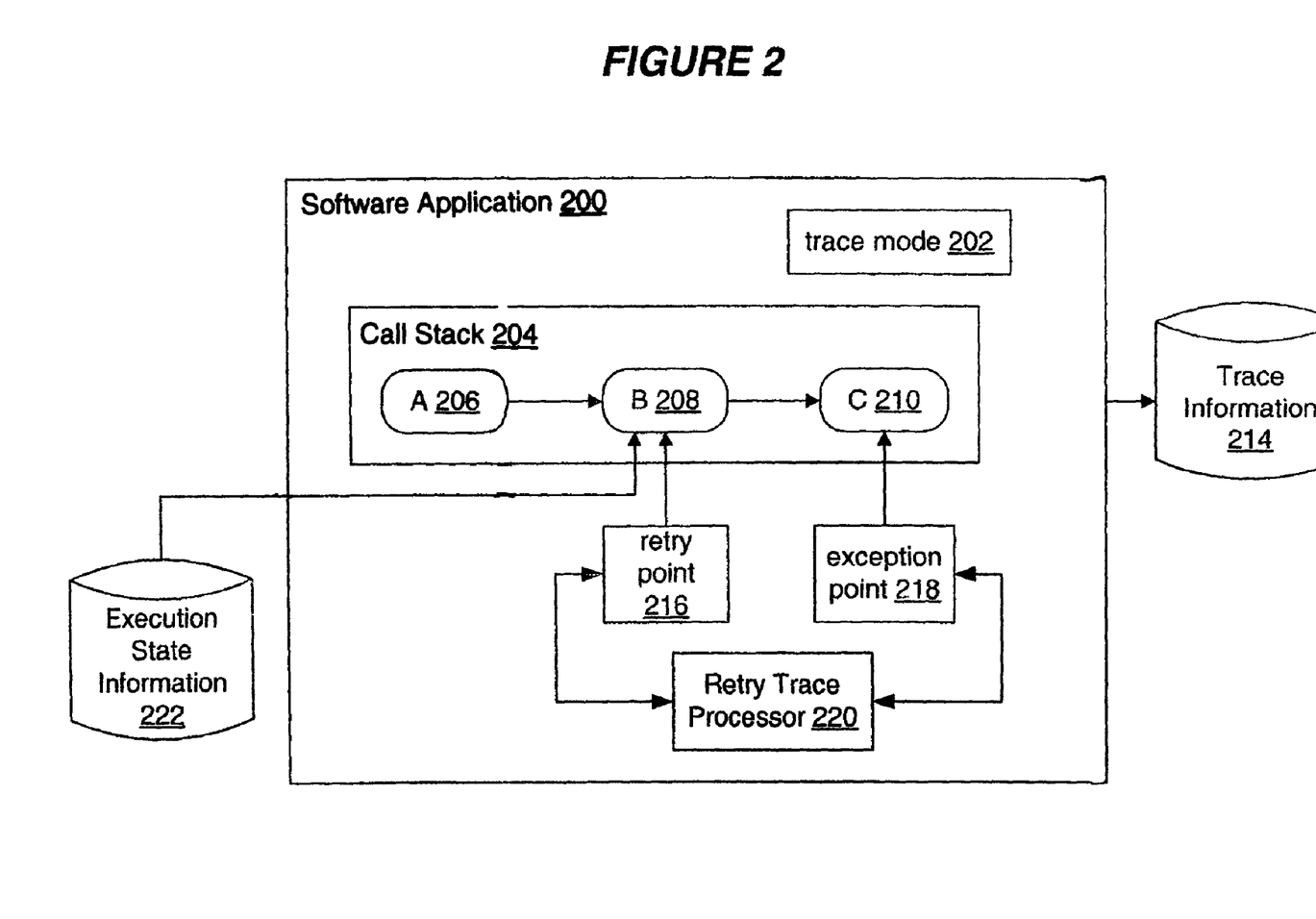
FIG. 2 is a block diagram of a software application in execution in accordance with an exemplary embodiment of the present invention.

FIG. 2 is a block diagram of a software application 200 in execution in accordance with an exemplary embodiment of the present invention. The software application 200 includes a call stack 204 which is a stack data structure of software routines forming part of, or used by, the software application 200. The call stack 204 resides within a storage of a computer system executing the software application 200. The software routines A 206, B 208 and C 210 are illustrated as stored in the call stack 204. The call stack 204 is an ordered data structure such that the order in which software routines call each other is stored within the call stack by virtue of the arrangement of software routines in the call stack 204.

In the example of FIG. 2 software routine A 206 called software routine B 208, which in turn called software routine C 210. Each software routine will normally execute to completion and return to the software routine which called it. Thus, when software routine C 210 completes, execution can return to software routine B 208. Completed software routines are removed from the call stack 204 as they return to respective calling software routines.

Software routines A 206, B 208, and C 210 are executable software components constituting part of, or being called by, the software application 200. For example, the software routines can be functions, procedures, subroutines, macros, application programming interface routines, programs, subprograms, software methods or any other executable program component. Software routines A 206, b 208, and C 210 can include a series of instructions to the CPU 102 of a computer system for their execution.

The software application 200 is operable to generate trace information 214 which is recorded in a data store. In this regard, the software routine is operable in one of at least two modes including a trace mode 202. In the trace mode, trace information is recorded to the trace information data store 214. In the absence of the trace mode, such trace information is not recorded. Trace information can include, by way of example only, the state and content of data structures, variables, flags and other data items used by or included in the software application 200, descriptive information relating to the state or functioning of the software application 200, failure data information, storage dumps, software routine entry point information, software routine exit point information, call stack information, and exception information. The trace mode 202 is switchable to an 'on' and 'off' state at runtime. For example, the trace mode 202 can be a global flag accessible to all software routines in, and used by, the software application 200. In this way, software routines are able to determine whether to generate and record trace information by interrogating the global flag. Other techniques for the operation of a trace mode 202 will be apparent to those skilled in the art. When the trace mode 202 is 'on', trace information 214 is generated which can cause system performance to suffer. When the trace mode 202 is 'off', trace information 214 is not generated and system performance will not be affected.

While the trace mode 202 has been described as a polarized 'on' and 'off' system of operation, it will be apparent to those skilled in the art that varying degrees of trace mode 202 can be implemented and such variable tracing modes are entirely compatible with the exemplary embodiments of the present invention described herein. In particular, the trace mode 202 'off' can, in practice, be implemented as a 'reduced' trace mode wherein trace information is generated at a coarser granularity, or a lower frequency, than in the trace mode 202 'on'. In this regard, the characteristics of the trace mode 202 which are pertinent to the present description are that the trace mode 202 'off' is less burdensome (in that it may be less resource intensive, less processing overhead, less storage intensive, for example) than the trace mode 202 'on'.

The software application 200 further includes an identification of an exception point 218. The exception point 218 is a nominal identifier for the purpose of explanation only of a location in a series of instructions forming part of the software application 200 (or called by the software application 200) where an exception occurs at execution time. Such an exception can include, for example, irregular or undesirable results, erroneous data, interruptions to execution, poor performance, excessive and unnecessary resource utilization, abnormal or premature termination, abnormal state, and a complete failure of the application. Such exceptions are detectable by facilities such as error detection routines, First Failure Data Capture (FFDC) facilities, exception handlers, error handlers and operating system interrupt or error handlers. In the example of FIG. 2, software routine C 210 is illustrated as including the exception point 218, indicating that it is within software routine C 210 that an exception will occur during execution.

The software application 200 further includes a retry point 216 which is a defined point in a series of instructions for the execution of the software application 200. The retry point 216 can be defined by a software developer or an automated retry point defining routine. Such a routine may operate by scanning software routines comprising the software application 200 and insert retry point 216 using defined criteria. For example, an aspect oriented software environment may weave retry point software aspects into software methods in accordance with an aspect definition. Such an aspect definition can include, for example, the entry or exit point of every method, every occurrence of a particular method or function call, every method executing at a regular frequency of temporal distance, and the occurrence of a developer inserted indicator.

The retry point 216 is a defined point in the execution of the software application for retrying execution of the software application 200 in the event of an exception. When executed, the retry point 216 records execution state information 222 to a data store. The execution state information includes all information required to allow the execution of the software application 200 to restart from the retry point 216. For example, the execution state information can include the call stack state, local and global variable information, and pertinent content in the memory of the computer system. A retry trace processor 220 is operable to detect an exception at exception point 218 and identify the appropriate retry point 216. The retry trace processor 220 is then operable to retry the execution of the software application 200 commencing from the retry point 216. An important part of the operation of the retry trace processor 220 and the retry point 216 is that the trace mode 202 is turned 'on' when execution is retried from the retry point 216. Subsequently, when the exception point 218 has been executed during the retry, the trace mode 202 is turned 'off'.

During retry, the trace mode 202 can be turned 'on' by the retry trace processor 220 or alternatively by the software routine B 208 as part of the retry point 216. Subsequently, the trace mode 202 can be turned 'off' in one of two main ways. First, if the exception point 218 causes an exception during the execution from the retry point 216, the retry trace processor 220 can be triggered and the trace mode 202 can be turned to 'off' by the retry trace processor 220. Alternatively, it is possible that the exception point 218 does not cause an exception during execution from the retry point 216. This is common in software problem determination—problems caused by such aspects as timing and synchronization may not be reproduced on subsequent execution of a software routine. In particular, the very change to a trace mode 202 of 'on' can cause timing differences which manifest in an exception which is not reproducible.

In this scenario, the trace mode 202 can be switched to 'off' when the software routine B 208 is to be removed from the call stack 204. The removal of software routine B 208 from the call stack 204 is an indication that the software routine C 210 executed without exceptions, and is a useful trigger to deactivate the trace mode 202. Thus, regardless of whether the execution from the retry point 216 results in an exception at the exception point 218, the trace mode 202 can be switched to an 'off' state to prevent the undesirable burden of ongoing tracing during the subsequent execution of software application 200.

In this way, the software application 200 executes with the trace mode 202 'on' during the retry execution of the software application 200 between the define retry point 216 and the exception point 218. Notably, the software application returns to the trace mode 202 'off' once the exception point 218 is executed with trace mode 'on' during the retry execution. Thus, trace information 214 is generated for the retry of the software application 200 but not for the entire execution of the software application 200. Further, trace information 214 is not generated for the execution of the software application 200 following the exception point during the retry execution, since the software application 200 is returned to the trace mode 202 'off'. In this way, the extent of the execution of the software application 200 which is undertaken with trace mode 202 'on' is reduced to only that extent necessary to cover the retry execution. The impact of tracing the execution of the software application 200 is therefore limited to the retry execution.

While many of the elements of FIG. 2 are represented as residing within the software application 200, it will be apparent to those skilled in the art that these elements may alternatively reside outside the software application 200 and instead reside elsewhere within a computer system, such as in the storage of the computer system, or may form part of another aspect of the computer system such as a part of the operating system. In particular, the call stack 204 data structure may be organized to reside outside the software application 200 itself but within the storage of the computer system such as a memory of the computer system. Similarly, the retry trace processor 220 may be a facility provided in software or hardware outside the software application itself, such as part of an operating system or a service component associated therewith.

Figure 3:
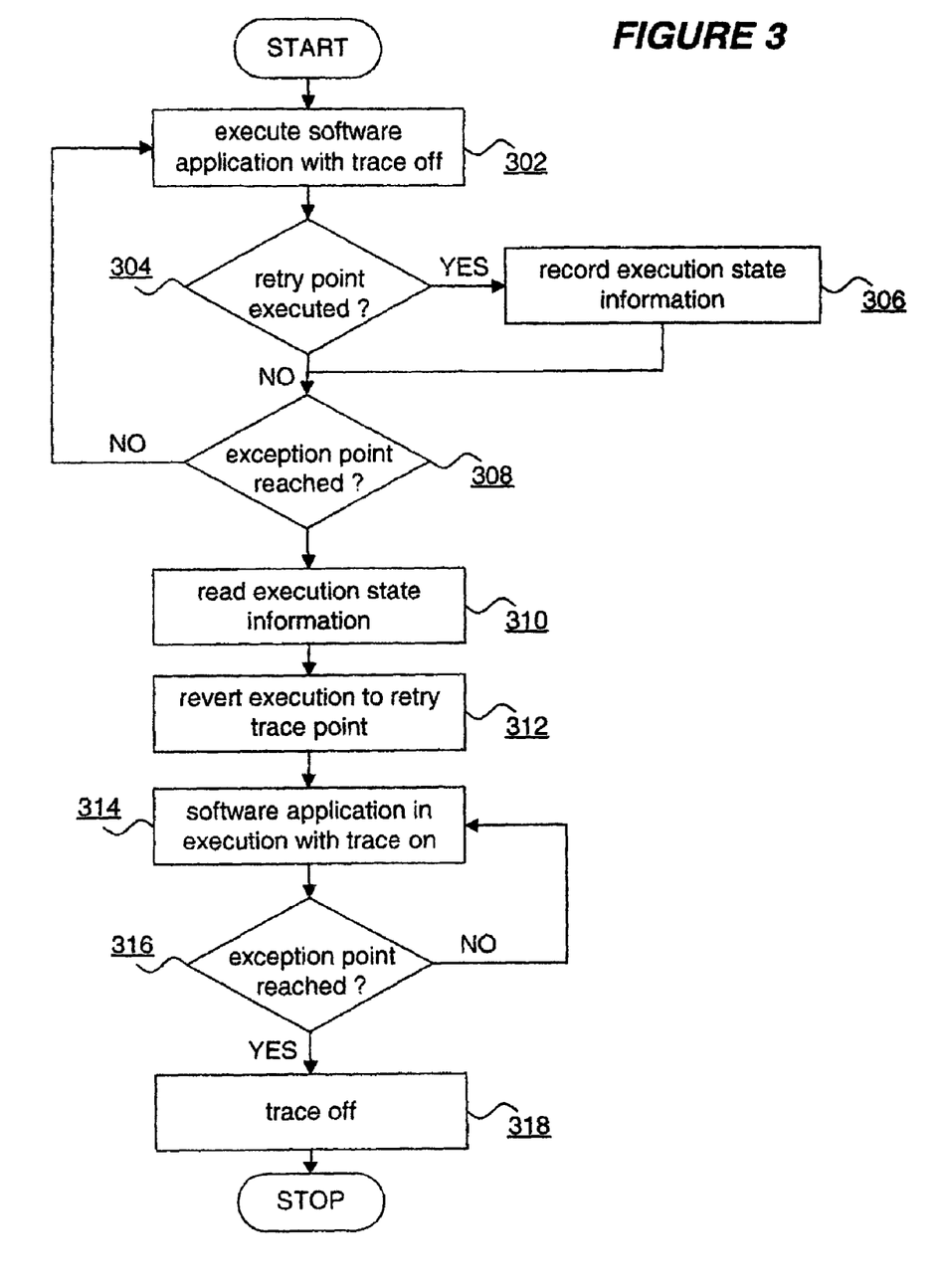
FIG. 3 is a flowchart of a method in accordance with an exemplary embodiment of the present invention.

FIG. 3 is a flowchart of a method in accordance with an exemplary embodiment of the present invention. At step 302, the software application 200 executes with trace mode 202 off. At step 304, the method determines if a retry point 216 is executed. If a retry point is executed, the method records execution state information at step 306. At step 308, the method determines if an exception point 218 is reached 308. If an exception point 218 is reached, the retry trace processor 220 reads the execution state information 222 at step 310 and reverts execution to the retry trace point 216 at step 312. At step 314 the software application executes with trace mode 202 'on' until the exception point is reached at step 316. Once the exception point is reached, the trace mode 202 is set to 'off' at step 318.

The determination as to whether the exception point is reached 316 is preferably made by recognizing that an exception has occurred during the retry execution, or alternatively by recognizing that the software routine B 208 having the retry point 216 is to be removed from the call stack 204.

Figure 4:
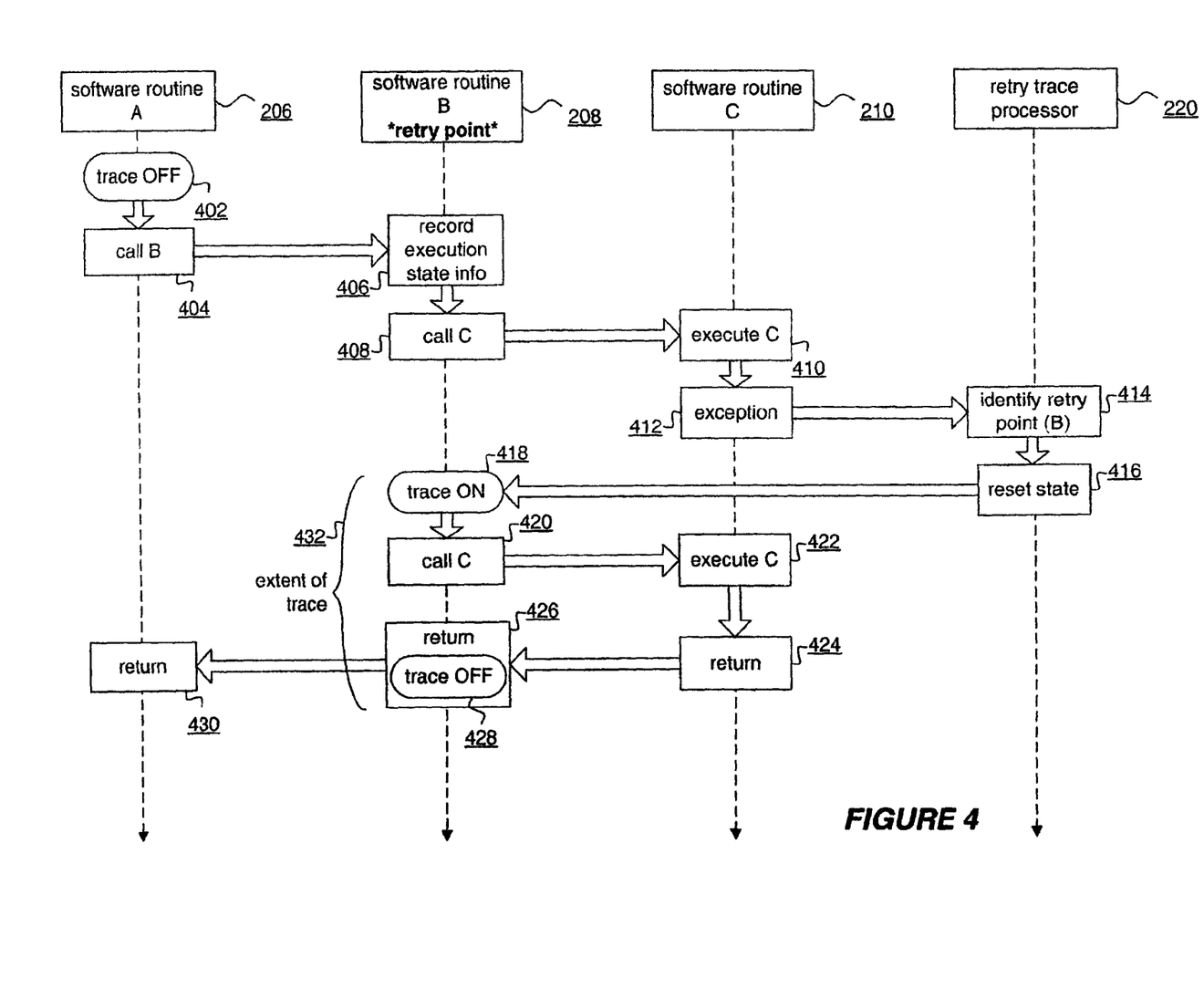
FIG. 4 is a state diagram illustrating an exemplary embodiment of the present invention in use for the software application of FIG. 2.

FIG. 4 is a state diagram illustrating an exemplary embodiment of the present invention in use for the software application 200 of FIG. 2. Initially, at 402, the software application 200 commences execution in software routine A 206 with the trace mode 202 'off'. Software routine A 206 calls software routine B 208 at 404. Software routine B 208 is identified as including the retry point 216. Execution state information 222 is recorded at 406 and subsequently at 408 software routine B 208 calls software routine C 210. At 410, software routine C executes and an exception occurs at 412 during execution. The exception is detected by the retry trace processor 220 at 414, and the retry trace processor 220 identifies the retry trace point 208 at 414. Subsequently, at 416, the retry trace processor 220 resets the state of the software application 200 using the execution state information 222 for the retry point 216 in order to revert execution to the retry point 216 in software routine B 208. At 418, software routine B 208 initially turns trace mode 202 to 'on' before undertaking to call software routine 210 at 420. Alternatively, the trace mode 202 can be changed to 'on' by the retry trace processor 220 as part of its processing at 416. At 422, the software routine C 210 executes to completion (with no exception) and returns at 424 to the calling software routine B 208. Subsequently, at 426 software routine B turns trace mode 202 to 'off' as part of its return to calling routine A 206. At 430 software routine A also returns to its calling routine. In this way, the extent of the execution of software application 200 (which has trace mode 202 'on') is limited to only that extent indicated at 432. All other aspects of the execution of the software application 200 were undertaken with trace mode 202 'off'.

Figure 5:
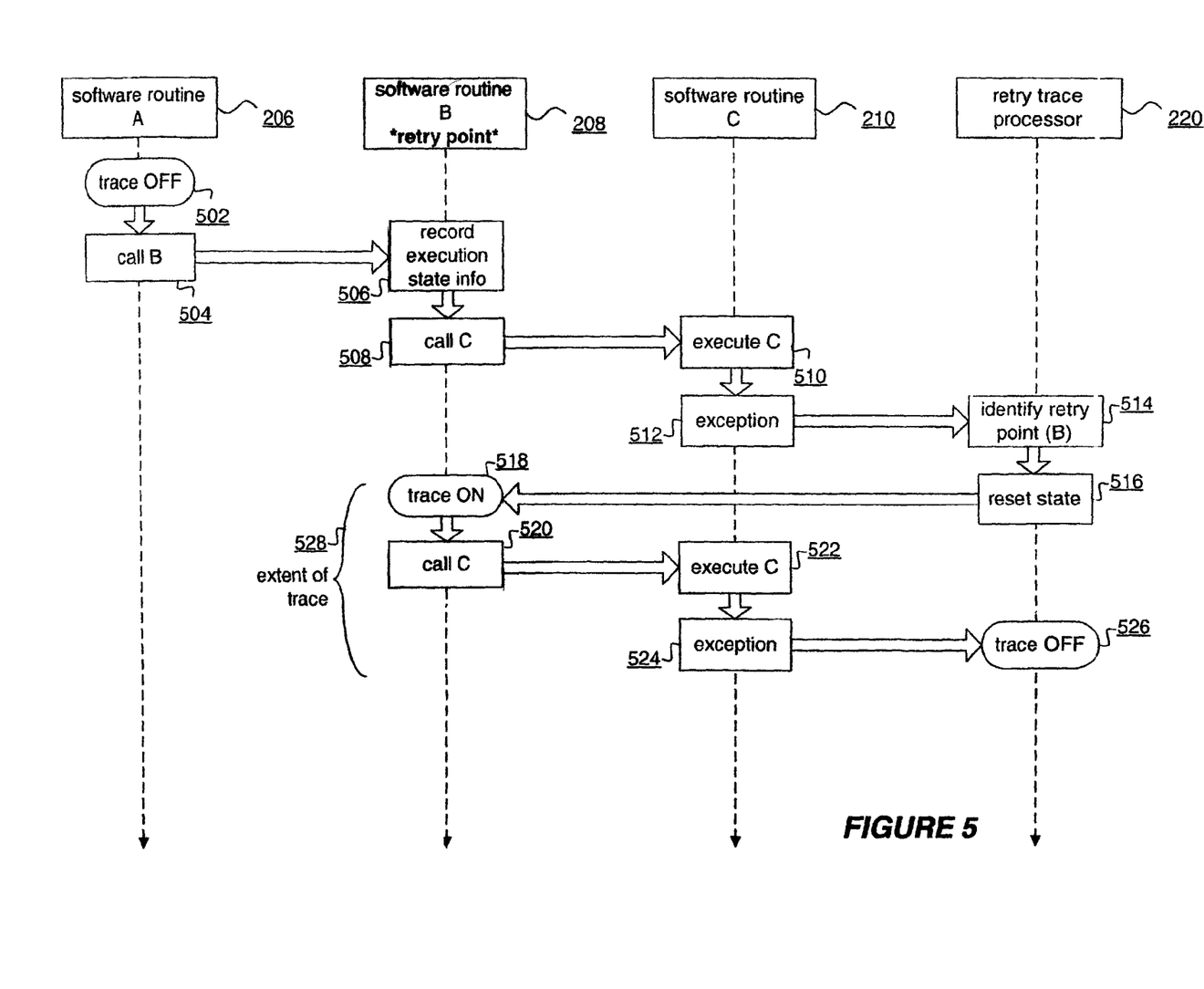
FIG. 5 is a further state diagram illustrating an exemplary embodiment of the present invention in use for the software application of FIG. 2.

FIG. 5 is a further state diagram illustrating an exemplary embodiment of the present invention in use for the software application 200 of FIG. 2. Initially, at 502, the software application 200 commences execution in software routine A 206 with the trace mode 202 'off'. Software routine A 206 calls software routine B 208 at 504. Software routine B 208 is identified as including the retry point 216. Execution state information 222 is recorded at 506 and subsequently at 508 software routine B 208 calls software routine C 210. At 510, software routine C executes and an exception occurs at 512 during execution. The exception is detected by the retry trace processor 220 at 514, and the retry trace processor 220 identifies the retry trace point 216 at 514. Subsequently, at 516, the retry trace processor 220 resets the state of the software application 200 using the execution state information 222 for the retry point 216 in order to revert execution to the retry point 216 in software routine B 208. At 518, software routine B 208 initially turns trace mode 202 to 'on' before undertaking to call software routine C210 at 520. Alternatively, the trace mode 202 can be changed to 'on' by the retry trace processor 220 as part of its processing at 516. At 522, the software routine C 210 executes and an exception occurs at 524 during execution. The exception is detected by the retry trace processor 220 at 526 which subsequently turns the trace mode 202 to 'off'. In this way, the extent of the execution of software application 200 which has trace mode 202 'on' is limited to only that extent indicated at 528. All other aspects of the execution of the software application 200 were undertaken with trace mode 202 'off'.

Figure 6:
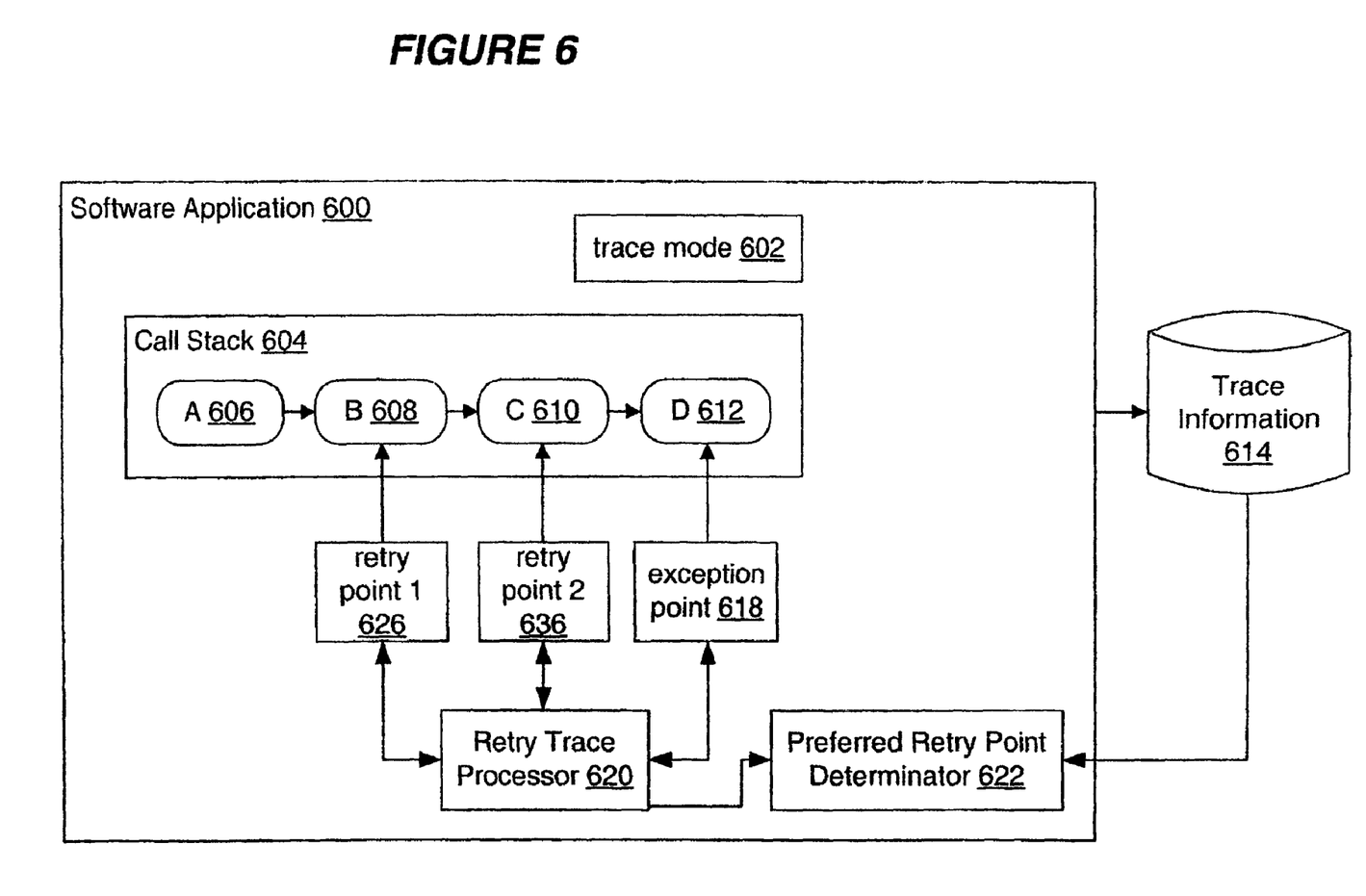
FIG. 6 is a block diagram of a software application in execution in accordance with an exemplary embodiment of the present invention.

FIG. 6 is a block diagram of a software application 600 in execution in accordance with an exemplary embodiment of the present invention. Many of the elements of FIG. 6 are identical to those described above with respect to FIG. 2 and these will not be repeated here. The software application 600 of FIG. 6 includes an additional software routine D 612 and two distinct retry points: retry point 1 626 located in software routine B 608; and retry point 2 636 located in software routine C 610. While FIG. 6 is illustrated with two retry points 626 and 636, this is merely exemplary and it will be apparent to those skilled in the art that any number of multiple retry points could be defined for a software application, including substantially more than two. The retry trace processor 620 of FIG. 6 is operable to detect and respond to an exception at exception point 618 in software routine D 612. The retry trace processor 620 is further operable to repeatedly execute the software application to cause occurrences of the exception. The repeated executions are achieved by multiple retry executions using each of the multiple retry points 626 and 636 in accordance with the techniques described above with respect to FIGS. 2 to 5.

Once each retry point 626 and 636 has been employed to generate trace information for the exception in software application 600, a preferred retry point determinator 622 determines which of the retry points 626 and 636 is preferred for tracing the exception. In one embodiment, this determination is made with input from an operator. In an alternative embodiment, the determination is based on an analysis of the trace information 614 generated by each of the retry points 626 and 636 in conjunction with predefined criteria. For example, trace information 614 is grouped and associated with a retry point 626 or 636 responsible for its generation. Subsequently, the preferred retry point determinator 622 ranks the groups of trace information 614 in accordance with predefined criteria. Such criteria can include, for example: a quantity of trace information generated, a quantity of trace information generated for a particular data structure in the software application 600, and a quantity of trace information generated for a particular software routine in the software application 600. The preferred retry point determinator 622 is then operable to select the one of the retry points 626 or 636 associated with the best ranked group of trace information 614 as the preferred retry point.

Figure 7:
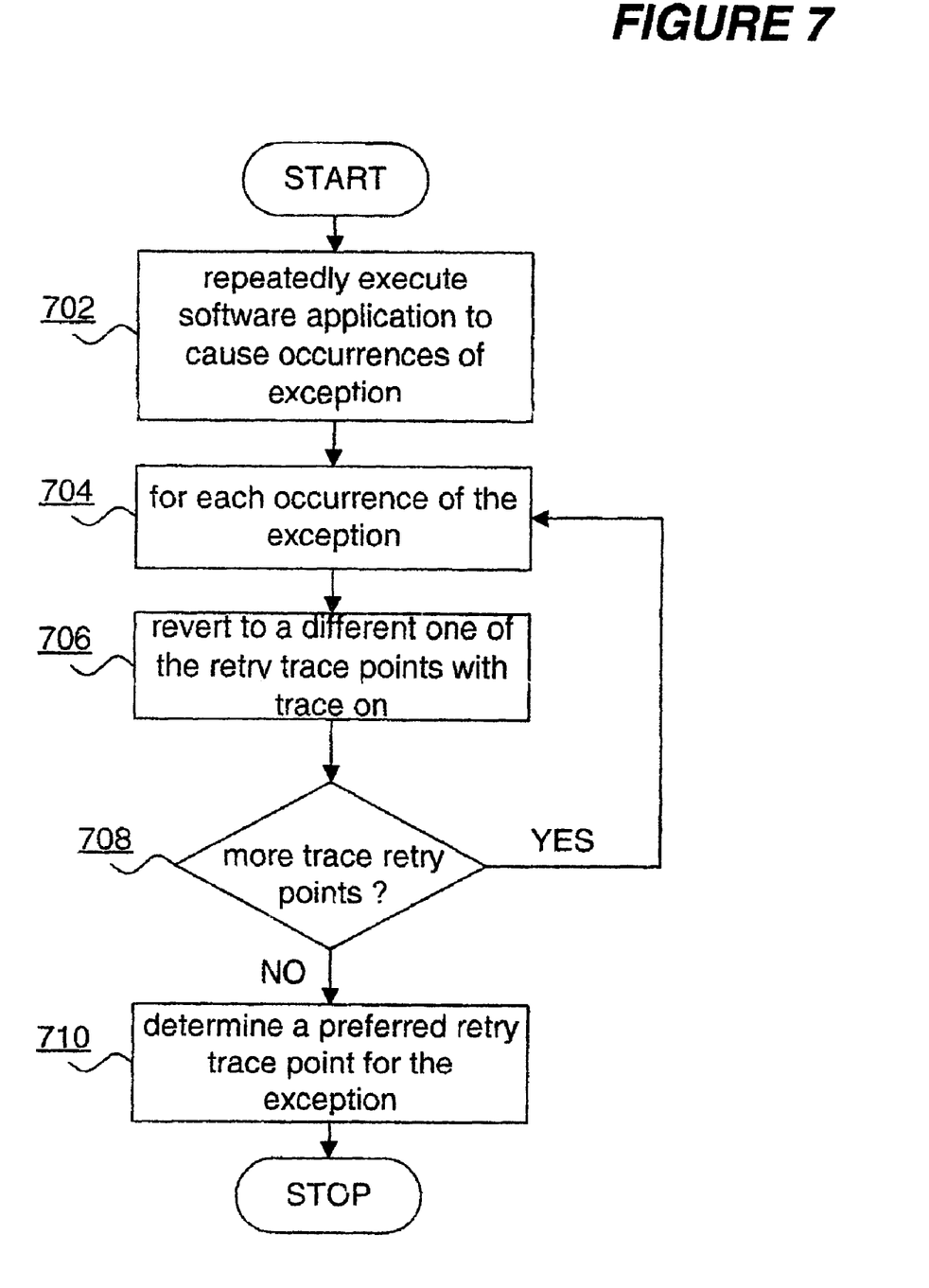
FIG. 7 is a flowchart of a method in accordance with an exemplary embodiment of the present invention.

FIG. 7 is a flowchart of a method in accordance with an exemplary embodiment of the present invention. At step 702, the software application 600 is repeatedly executed to cause occurrences of the exception at exception point 618. For each occurrence of the exception, execution is reverted to a different one of the retry trace points 626, 636 with trace mode 602 set to 'on' at steps 704 to 708. This is preferably achieved by having execution state information stored for each of the retry points 626, 636 as described in detail above with respect to FIG. 2. At step 710 the preferred retry point determinator 622 determines a preferred retry point for the exception.

Figure 8:
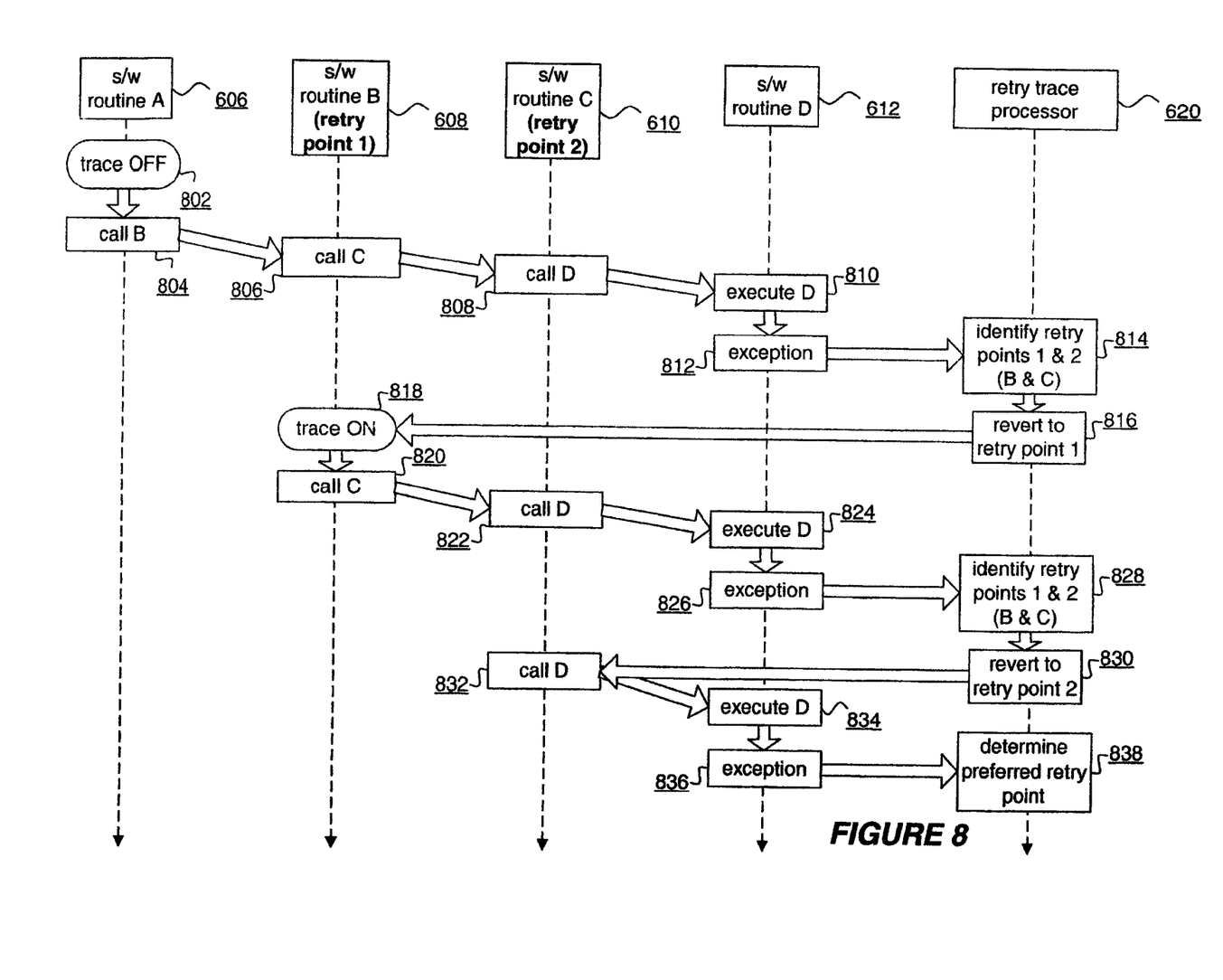
FIG. 8 is a state diagram illustrating an exemplary embodiment of the present invention in use for the software application of FIG. 6.

FIG. 8 is a state diagram illustrating an exemplary embodiment of the present invention in use for the software application 600 of FIG. 6. Initially, at 802, the software application 600 commences execution in software routine A 606 with the trace mode 602 'off'. Software routine A 606 call software routine B 608 at 804. Software routine B 608 is defined to include retry point 1 626. Subsequently, software routine B 608 calls software routine C 610 at 806. Software routine C 610 is defined to include retry point 2 636. Subsequently, software routine C 610 calls software routine D 612 at 808. Software routine D 612 executes at 810 and an exception occurs at 812. The exception is detected by the retry trace processor 620 at 814 which identifies relevant retry points 626 and 636 in software routines B 608 and C 610. At 816 the retry trace processor 620 reverts execution to retry point 1 626 in software routine B 608. At 818, software routine B 608 activates tracing by turning trace mode 602 to 'on' and calls software routine C at 820. At 822 software routine C calls software routine D which executes at 824 and causes an exception at 826. The exception is detected by the retry trace processor 620 at 828 which reverts to retry point 2 636 in software routine C 610 at 830. At 832, software routine C 610 calls software routine D which executes at 834 and causes an exception at 836. The exception is detected by the retry trace processor at 838 which turns the trace mode 602 to 'off' and, along with the preferred retry point determinator 622, determines a preferred retry point for the exception point 618 caused at 812, 826, and 836. The preferred retry point can be determined using the techniques described above with respect to FIG. 6. In this way, a preferred one of multiple retry points 626 and 636 can be determined for subsequent use in tracing an exception at exception point 618.

Figure 9:
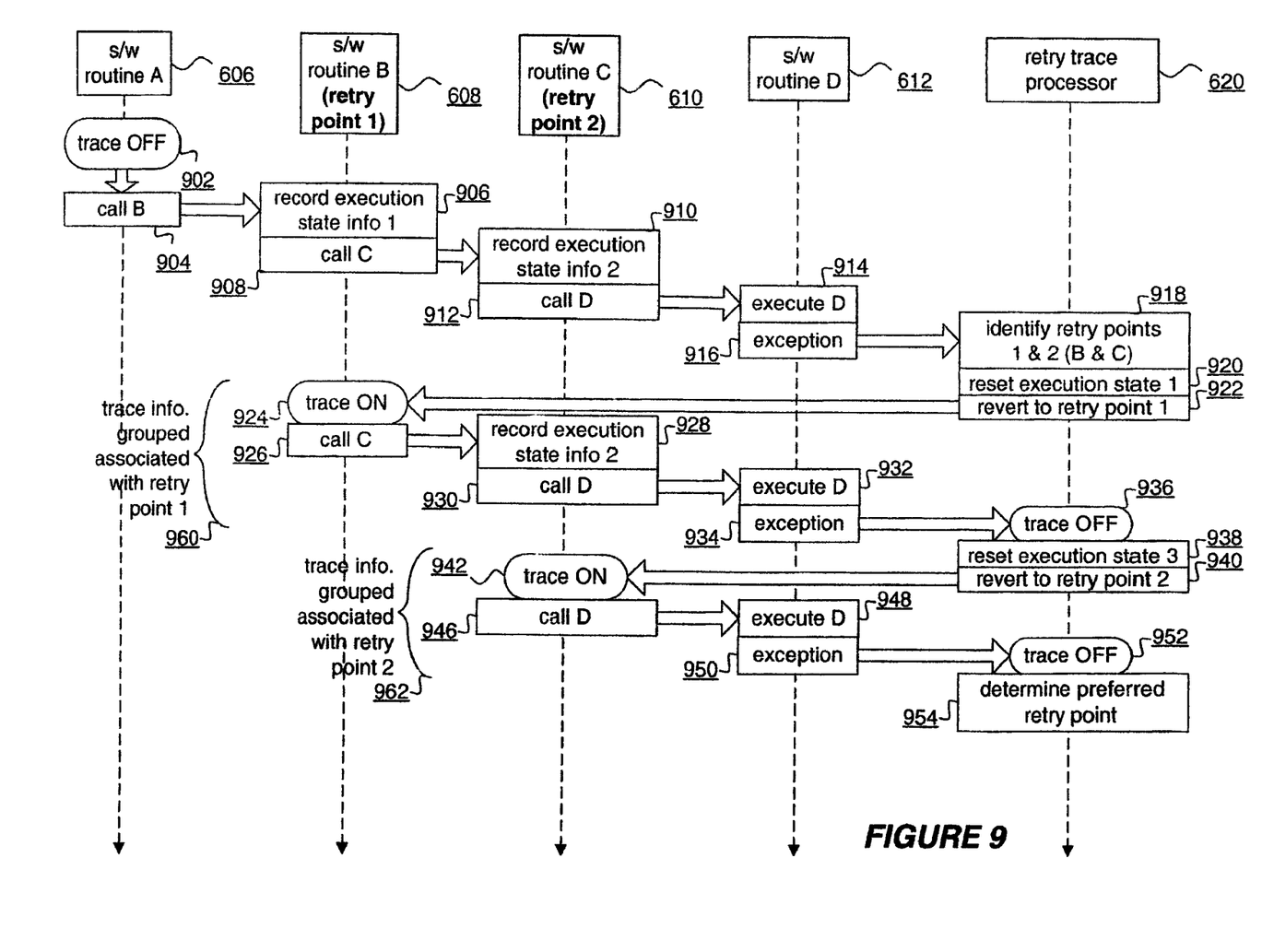
FIG. 9 is a further state diagram illustrating an exemplary embodiment of the present invention in use for the software application of FIG. 6.

FIG. 9 is a further state diagram illustrating an exemplary embodiment of the present invention in use for the software application 600 of FIG. 6. Initially, at 902, the software application 600 commences execution software routine A 606 with the trace mode 602 'off'. Software routine A 606 calls software routine B 608 at 904. Software routine B 608 is defined to include retry point 1 626 and records execution state information associated with retry point 1 626 at 906. Subsequently, software routine B 608 calls software routine C at 908. Software routine C 610 is defined to include retry point 2 636 and records execution state information associated with retry point 2 636 at 910. Subsequently, software routine C 610 calls software routine D 612 at 912. At 914 software routine D 612 executes and causes an exception at 916. The exception is detected by the retry trace processor 620 at 918 and retry points 626 and 636 are identified. At 920, execution state is reset to that associated with retry point 1 626 is reset and at 922 execution is reverted to retry point 1 in software routine B 608. At 924 software routine B 608 turns trace mode 602 to 'on' and calls software routine C 610 at 926. Software routine C 610 is defined to include retry point 2 636 and records execution state information associated with retry point 2 636 at 928. Alternatively, as a further optimization, the recording of execution state information at 928 can be avoided when software routine C 610 is executed as part of a retry execution. Subsequently, software routine C 610 calls software routine D 612 at 930.

At 932 software routine D 612 executes and causes an exception at 934. The exception is detected by the retry trace processor 620 at 936 which turns the trace mode 602 to 'off'. At 938 the retry trace processor 620 resets the execution state to that associated with retry point 2 636 and at 940 execution is reverted to retry point 2 in software routine C 610. At 942 software routine C 610 turns trace mode 602 to 'on' and calls software routine D 612 at 946. At 948 software routine D 612 executes and causes an exception at 950. The exception is detected by the retry trace processor 620 at 952 which turns the trace mode 602 to 'off'. Finally, at 954, the retry trace processor 620, along with the preferred retry point determinator 622, determines a preferred retry point for the exception point 618 caused at 916, 934, and 950. The preferred retry point can be determined using the techniques described above with respect to FIG. 6.

Alternatively, the exceptions occurring at 934 and 950 may not reoccur during the retry executions from retry point 1 626 and retry point 2 636. In these scenarios, the trace mode 602 can be switched to 'off' and the retry trace processor 620 can be triggered to revert to other trace points when the software routine is to be removed from the call stack 604. The use of the call stack 604 in such a way was described in some detail above with respect to FIGS. 2 and 4.

Notably, trace information generated by the retry points 626 and 636 can be grouped into trace information group 960 generated during the retry execution for retry point 1 626, and group 962 generated during the retry execution for retry point 2 636. Multiple retry points can be defined for the software application 600 and a preferred one of the retry points can be determined for tracing the exception arising from exception point 618.

In this way, embodiments of the present invention provide for the definition of multiple retry points 626 and 636 for a software application 600 which are operable to generate and record trace information only as part of a retry execution in response to an exception. Outside these conditions, the burdens of generating and recording trace information can be avoided. Furthermore, the determination of a preferred one of these retry points 626 and 636 can be made to focus the retry execution in a way that only the retry point which generates the most helpful, or informative, trace information is necessarily reverted to in response to an exception. It will be apparent to those skilled in the art that, despite the determination of a preferred retry point, the use of multiple retry points to provide a rich set of trace information may be desirable under certain circumstances and embodiments of the present invention can be readily adapted to provide such a facility.

Insofar as embodiments of the invention described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present invention. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk, etc., and the processing device utilizes the program or a part thereof to configure it for operation. The computer program may be supplied from a remote source embodied in a communications medium such as an electronic signal, radio frequency carrier wave, or optical carrier wave. Such carrier media are also envisaged as aspects of the present invention.

It will be understood by those skilled in the art that, although the present invention has been described in relation to the above described example embodiments, the invention is not limited thereto and that there are many possible variations and modifications which fall within the scope of the invention.

The scope of the present invention includes any novel features or combinations of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

What is claimed is:

1. A method for generating trace information for an exception in a software application, the software application including a plurality of retry points, each of the retry points being a defined point in a series of instructions for the execution of the software application, the method comprising:

repeatedly executing the software application to cause occurrences of the exception;

for each occurrence of the exception, reverting execution to a different one of the retry points such that after multiple occurrences of the exception each of the retry points is reverted to, wherein execution of each of the retry points includes generating trace information for the execution of the software application; and determining which of the retry points is a preferred retry point to generate trace information for subsequent occurrences of the exception.

2. The method of claim 1 further comprising, on execution of each of the retry points, recording execution state information for the retry point to enable execution of the software application to revert to the retry point.

3. The method of claim 2 further comprising, in response to a determination that each of the retry points has been reverted to, causing the generation of trace information for the execution of the software application to cease.

4. The method of claim 2 further comprising, in response to a determination that a reversion of execution to a one of the retry points causes an occurrence of the exception, causing the generation of trace information for the execution of the software application to cease.

5. The method of claim 2 further comprising, in response to a determination that a retry point, being a one of the retry points to which execution is so reverted, is to be removed from a call stack for the software application, causing the generation of trace information for the execution of the software application to cease.

6. The method of claim 1, wherein the determining which of the retry points is a preferred retry point step further comprises:

receiving an input indicating which of the retry points is a preferred retry point.

7. The method of claim 1, wherein generated trace information is grouped and associated with a retry point causing its generation, and the determining which of the retry points is a preferred retry point step further comprises:

analyzing groups of generated trace information for each of the retry points using one or more predefined criteria to rank the groups of generated trace information according to the predefined criteria; and selecting a retry point associated with a best ranked group of trace information as the preferred retry point.

8. The method of claim 7, wherein the predefined criteria includes a quantity of trace information generated.

9. The method of claim 8, wherein the predefined criteria includes a quantity of trace information generated for a particular data structure in the software application.

10. The method of claim 8, wherein the predefined criteria includes a quantity of trace information generated for a particular software routine in the software application.

11. A set of machine readable instructions stored on a machine readable medium causing at least one machine to perform a set of steps comprising:

repeatedly executing software application to cause occurrences of an exception, the software application including a plurality of retry points, each of the retry points being a defined point in a series of instructions for the execution of the software application;

for each occurrence of the exception, reverting execution to a different one of the retry points such that after multiple occurrences of the exception each of the retry points is reverted to, wherein execution of each of the retry points includes generating trace information for the execution of the software application; and determining which of the retry points is a preferred retry point to generate trace information for subsequent occurrences of the exception.

12. An apparatus for generating trace information for an exception in a software application, the software application including a plurality of retry points, each of the retry points being a defined point in a series of instructions for the execution of the software application, the apparatus comprising:

means for repeatedly executing the software application to cause occurrences of the exception;

means for, for each occurrence of the exception, revert execution to a different one of the retry points such that after multiple occurrences of the exception each of the retry points is reverted to, wherein execution of each of the retry points includes generating trace information for the execution of the software application; and means for determining which of the retry points is a preferred retry point to generate trace information for subsequent occurrences of the exception.

13. The apparatus of claim 12 further comprising, means for, on execution of each of the retry points, recording execution state information for the retry point to enable execution of the software application to revert to the retry point.

14. The apparatus of claim 13 further comprising, means for, in response to a determination that each of the retry points has been reverted to, causing the generation of trace information for the execution of the software application to cease.

15. The apparatus of claim 13 further comprising, means for, in response to a determination that a reversion of execution to a one of the retry points causes an occurrence of the exception, causing the generation of trace information for the execution of the software application to cease.

16. The apparatus of claim 13 further comprising, means for, in response to a determination that a retry point, being a one of the retry points to which execution is so reverted, is to be removed from a call stack for the software application, causing the generation of trace information for the execution of the software application to cease.

17. The apparatus of claim 12, wherein the means for determining which of the retry points is a preferred retry point further comprises:

means for receiving an input indicating which of the retry points is a preferred retry point.

18. The apparatus of claim 12, wherein generated trace information is grouped and associated with a retry point causing its generation, and means for determining which of the retry points is a preferred retry point further comprising:

means for analyzing groups of generated trace information for each of the retry points using one or more predefined criteria to rank the groups of generated trace information according to the predefined criteria; and means for selecting a retry point associated with a best ranked group of trace information as the preferred retry point.

19. The apparatus of claim 18, wherein the predefined criteria includes a quantity of trace information generated.

20. The apparatus of claim 12, said apparatus further comprising:

a central processing unit; a memory subsystem; an input/output subsystem; and a bus subsystem interconnecting the central processing unit.

* * * * *